May 13, 1924.
J. F. JOHNSON ET AL
BEARING BURNING IN DEVICE
Filed Jan. 6, 1923
1,493,547
5 Sheets-Sheet 1
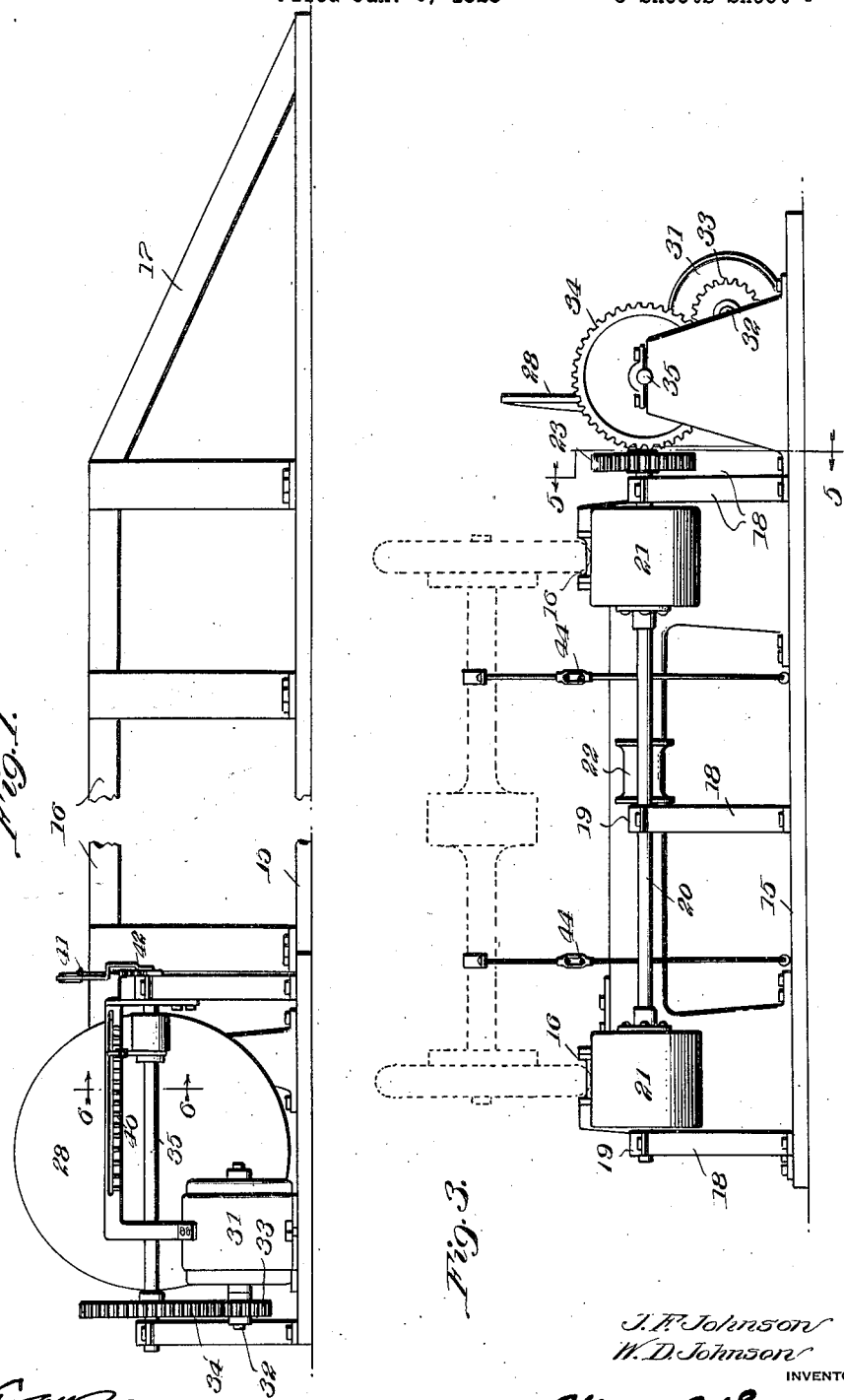

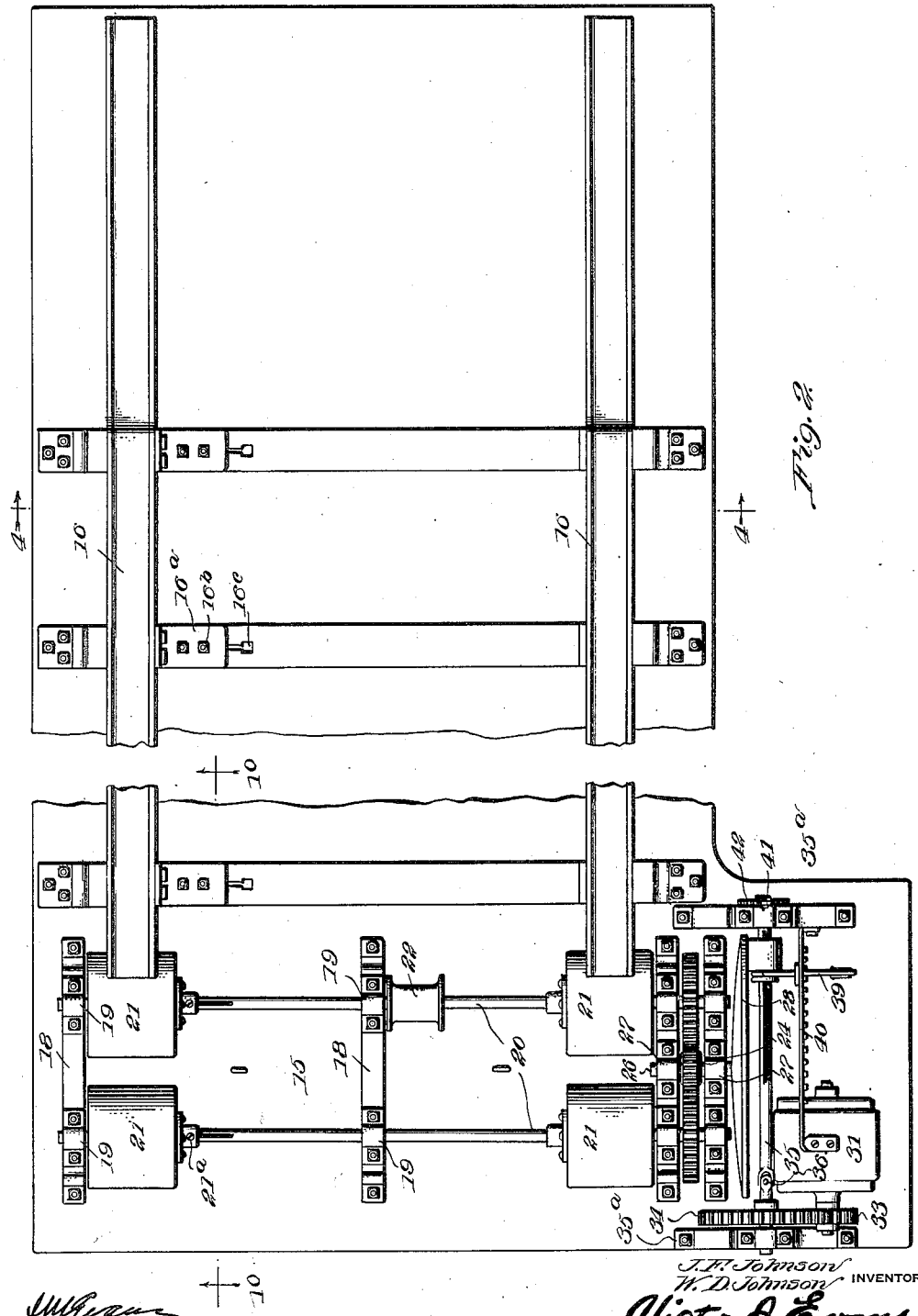

May 13, 1924.
J. F. JOHNSON ET AL
BEARING BURNING IN DEVICE
Filed Jan. 6, 1923
1,493,547
5 Sheets-Sheet 3
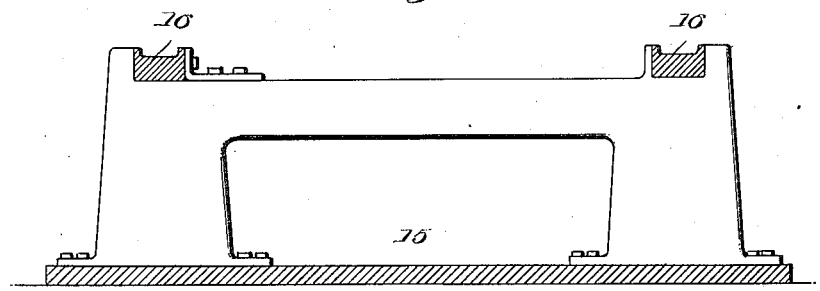
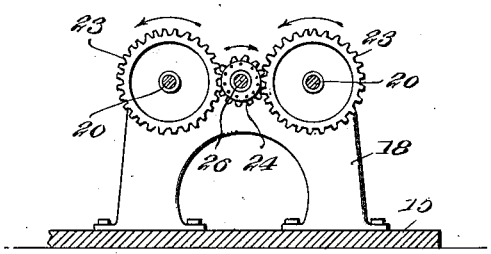
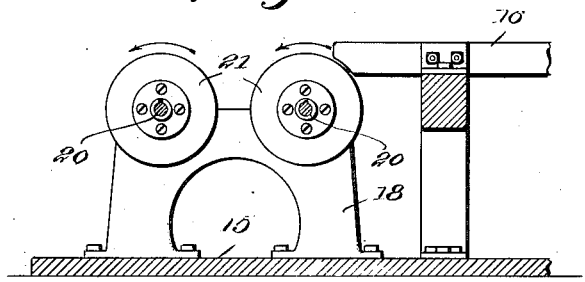

May 13, 1924.
J. F. JOHNSON ET AL
1,493,547
BEARING BURNING IN DEVICE
Filed Jan. 6, 1923     5 Sheets-Sheet 4
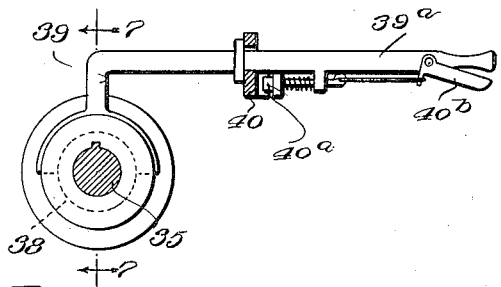
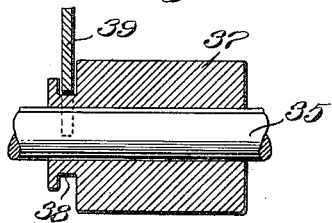
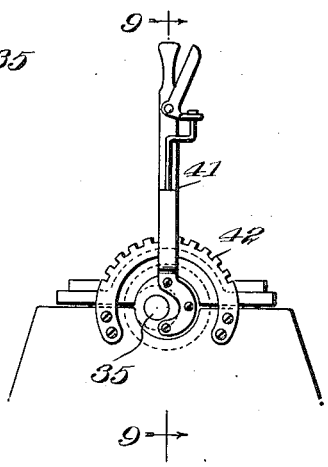
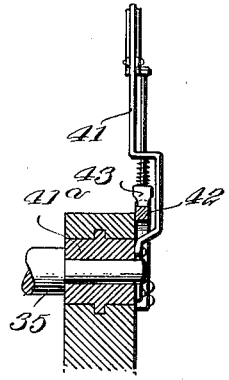
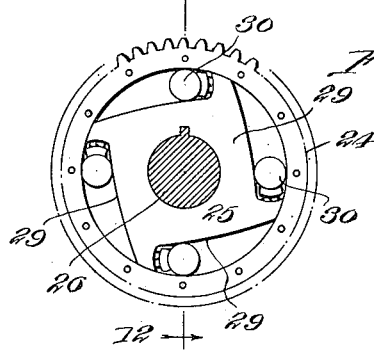
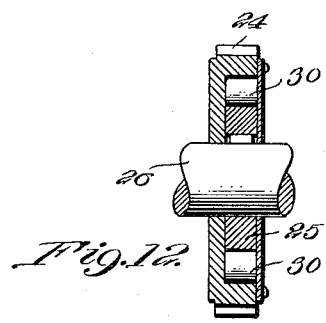
J. F. Johnson
W. D. Johnson
INVENTOR
BY Victor J. Evans
ATTORNEY
WITNESS:

Patented May 13, 1924.

1,493,547

UNITED STATES PATENT OFFICE.

JOHN F. JOHNSON AND WILL D. JOHNSON, OF BALTIMORE, MARYLAND.

BEARING BURNING-IN DEVICE.

Application filed January 6, 1923. Serial No. 611,094.

*To all whom it may concern:*

Be it known that we, JOHN F. JOHNSON and WILL D. JOHNSON, citizens of the United States, residing at Baltimore, in the county of Baltimore and State of Maryland, have invented new and useful Improvements in Bearing Burning-In Devices, of which the following is a specification.

This invention relates to apparatus designed for use by automobile mechanics and upon which an automobile may be disposed, the device being so constructed as to drive the automobile by imparting rotation to the rear axle thereof whereby to work in or "burn in" any bearings in the entire transmission mechanism or the bearings in the engine, the device furthermore being advantageous in "lapping in" piston rings and in detecting defects in the running of the engine.

An important object is the provision of a device of this character which in addition to the above functions has the added ability of starting new or stiff motors or those in which the batteries of the starting system have run down, without necessitating towing or cranking.

Another object is the provision of an apparatus of this character which may be driven at any speed desired and which is practically silent so that knocks or other undesired noises in the engine or transmission may be detected without necessitating tearing down the motor or other parts to discover the loose parts.

Yet another object is the provision of a device of this character which is provided with automatic clutch mechanism so that when a motor is operated by driving the rear wheels of the vehicle and the motor consequently starts, the drive mechanism of the device will be thrown out but will resume its action the instant that the motor of the vehicle again stops, all this being automatically controlled and involving the provision of a species of differential drive gear.

A further object is the provision of a device of this character which is adjustable so that vehicle of different gage, that is having varying distances between the wheels of each side, may be driven thereonto and be tested.

Another specific object is the provision of a novel form of manually controlled clutch throw-out device which is associated with the speed change.

An additional object is the provision of a structure of this character which will be comparatively simple and inexpensive in construction and installation, highly efficient in use, positive in action, easy to control and operate, efficient and durable in service, and a general improvement in the art.

With the above and other objects and advantages in view, the invention consists in the details of construction to be hereinafter more fully described and claimed and illustrated in the accompanying drawings in which:

Figure 1 is a side elevation of the device,

Figure 2 is a plan view,

Figure 3 is a rear view,

Figure 4 is a cross sectional view taken on the line 4—4 of Figure 2,

Figure 5 is a sectional view on the line 5—5 of Figure 3,

Figure 6 is a detail section on the line 6—6 of Figure 1,

Figure 7 is a detail section on the line 7—7 of Figure 6,

Figure 13:
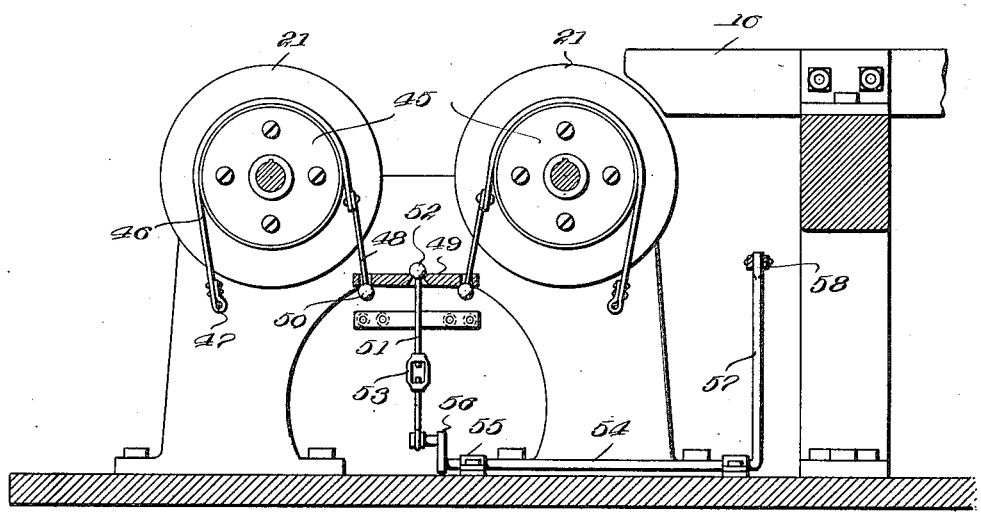
Figure 14:
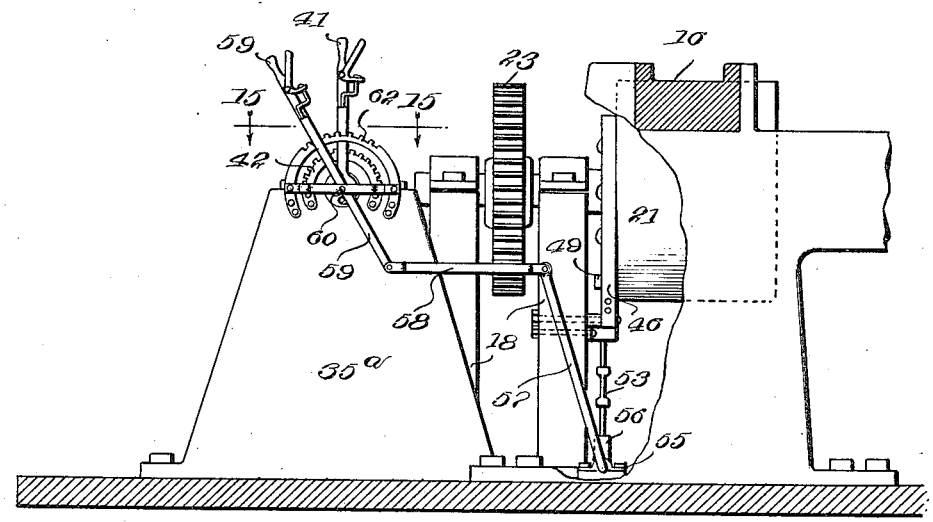
Figure 15:
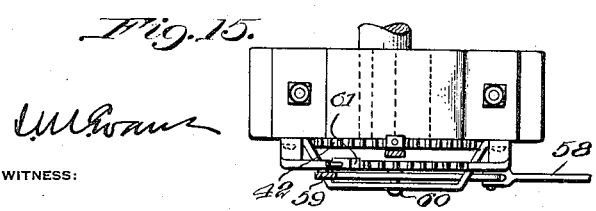

Figure 8 is a detail view of the clutch throw-out mechanism which is manually controlled, Figure 9 is a detail section on the line 9—9 of Figure 8, Figure 10 is a section on the line 10—10 of Figure 2, Figure 11 is a detail section showing the roller clutch structure, Figure 12 is a detail section on the line 12—12 of Figure 11, Figure 13 is a view similar to Figure 10 but illustrating a modification, Figure 14 is an end view, partly in section, of this form, Figure 15 is a section on the line 15—15 of Figure 14.

Referring more particularly to the drawings, the numeral 15 designates a suitable supporting frame which may be embodied in or suitably anchored to a cement or other floor of a garage or workshop, and this frame may be formed as a single casting or may be formed of a plurality of bars of suitable size and shape bolted together, and the specific dimensions may vary in accordance with experience in the results to be obtained, associated with the this frame are tracks 16 which are arranged in spaced parallel relation and which are grooved in cross section, as shown, so that an automobile or other motor vehicle may be driven thereonto. If desired, these tracks may be elevated, as shown in the drawings, with inclined end portions 17, or they may be embedded within the floor and be flush with the surface thereof. All of such details form no essential part of the present invention and many variations and modifications may be resorted to.

It is highly desirable that the tracks be adjustable so that the device will accommodate vehicles of wide or narrow gage. In carrying out this feature various means might be employed though I have illustrated one of the tracks 16 as being movably mounted and carrying brackets 16$^a$ slidable along their supports and provided with clamping bolts 16$^b$ movable along slots 16$^c$. By loosening the bolts the movable track may be moved into its innermost or outermost position for accommodating vehicles having varying distances between the wheels.

Suitably mounted upon the frame are upstanding brackets 18 carrying bearings 19 through which are journaled spaced parallel shafts 20 upon which are secured rollers 21 which are arranged in pairs, as shown, and which are disposed in alignment with the ends of the tracks 16, the arrangement being such that when a vehicle is driven onto the tracks the rear wheels will engage upon both pairs of rollers so as to be driven when the rollers are rotated. It should also be stated that the rollers at one end of the shafts 20 are longitudinally adjustably mounted so as to be moved in accordance with the adjustment of the tracks for varying the gage, these rollers being splined on the shafts and being equipped with set screws 21$^a$. Carried by one of the shafts is a nigger head 22 or winding drum upon which may be wrapped a cable or the like which may be connected with some convenient portion of the frame of a vehicle whereby the vehicle may be pulled onto the tracks and onto the rollers in case the vehicle cannot be moved under its own power.

At one end the shafts 20 carry spur gears 23 which both mesh with a ring gear 24 which surrounds a drive disk 25 keyed upon a shaft 26 journaled in suitable bearings 27 and carrying a large friction disk 28 driven by means to be described. The drive disk 25 is formed with a plurality of inclined slots 29 at its periphery and located within these slots are rollers 30 which provide the drive connection between the drive disk 25 and the ring gear 24. It will be observed that when the drive disk 25 is tending to rotate faster than the ring gear 24, the rollers 30 will jam against the inner periphery of the ring gear and the inclined portions of the slots so that the ring gear and drive disk will rotate as one, whereas, if the ring gear 24 is rotating faster than the drive disk, as will occur under circumstances to be hereinafter mentioned, the rollers 30 will drop into the innermost ends of the slots 29 and the connection between the drive disk and ring gear will be broken, both then rotating independently.

The numeral 31 designates a suitable electric or other motor, though the former is preferred, which is mounted upon the frame 15 and this motor has a drive shaft 32 carrying a pinion 33 meshing with a gear 34 secured upon a shaft 35 which is journaled transversely of the frame 15 in standards 35$^a$, that is at right angles to the shafts 20. Intermediate its ends the shaft 35 is provided with a universal joint 36. Splined upon the shaft 35 is a roller 37 normally engaging against the large friction disk 28 whereby to drive the latter and consequently the rollers 21. This roller is formed with a groove 38 which is engaged by a forked lever 39 having a handle 39$^a$ whereby the friction roller may be slid along the shaft 35 toward or from the center of the friction disk so as to vary the speed of rotation of the latter. The numeral 40 designated a rack or notched bar with which is engageable a latch 40$^a$ connected with a movable control grip 40$^b$ for holding the friction roller at the desired adjusted position.

In order that the friction roller 37 may be thrown into and out of contact with the friction disk 28 we provide a level 41 movable over a notched segment 42 and having the usual type of grip released locking pawl 43 associated therewith. This lever 41 is secured to a bearing 41$^a$ rotatably mounted in one of the standards 35$^a$ and the shaft 35 is journaled eccentrically in this bearing so that when the lever is rocked in one direction to move the bearing 41$^a$, the roller 37 will be brought into engagement with the friction disk 28 and when the lever is rocked in the other direction the roller 37 will be disengaged from the friction disk. This constitutes the clutch device for throwing the entire mechanism into and out of operation at the will of the operator.

In the operation of the device the vehicle to be worked upon is driven onto or pulled along the tracks 16 until the rear wheels engage upon the pairs of rollers 21 and, if preferred, any suitable guy rope or the like may be provided or the clamp and turn-buckle arrangement indicated at 44 in Figure 3, may be provided for holding the vehicle in position engaging the rollers and in such a way that the vehicle cannot possibly travel with respect to the tracks. When the motor 30 is then set in operation and the clutch lever 41 is operated to bring the friction roller 37 into engagement with the friction disk 28, the driving disk 25 will be operated which will cause rotation of the ring gear 24 and spur gears 23 and consequently rotation of the rollers 21. As these rollers 21 support the rear wheels of the vehicle, it is apparent that when the vehicle clutch is in, the entire transmission and motor thereof will be driven. It is intended that the various gears in the device be made silent or as noiseless as possible so that noises and knocks in the motor or transmission of the vehicle being tested or worked upon may be detected so that proper repairs or adjustments may be made. The device is well adapted for use in starting new motors and those which are stiff from being equipped with new bearings or from having the old bearings tightened, and also in starting heavy trucks and the like in which the starting systems are out of order. When the device is used in such a way it is apparent that when the vehicle motor starts it will probably drive the rollers 21 faster than they are driven by the electric motor of the device. When this occurs the ring gear 24 will be driven faster than the drive disk 25 so that the rollers 30 will drop into the larger ends of the slots 29 and allow the ring gear 24 to run free. If the vehicle motor should subsequently stop the rotation of the gear 24 will cease and the drive disk 25 and rollers 30 will again exert their gripping action upon the ring gear 24 and resume the driving of the vehicle transmission and motor, this action being entirely automatic and involving no manipulation at all on the part of the operator or mechanic.

In the modified form of the device shown in Figures 13, 14 and 15, I have illustrated a brake mechanism which is operable to hold the rollers 21 stationary so that the vehicle may be driven off from the device by its own power. If the brake means were not provided this could not be done as the application of power to the rear wheels of the vehicle would simply result in turning the rollers and drive mechanism associated therewith. In carrying out the provision of this brake mechanism, I make use of brake drums 45 secured to one pair of rollers 21, and partially encircling these drums are flexible brake bands 46 each of which has one end secured at 47 and its other end provided with a rod or other connection 48. The numeral 49 designates a species of draw bar, through which pass the two end members or rods 48, these rods being equipped with heads 50 or the like which will prevent them from being withdrawn from this draft bar. Depending centrally from the draw bar is a rod 51 likewise equipped with a head 52 and provided intermediate its ends with a turn buckle 53 by means of which it may be shortened or lengthened as occasion may demand. The operating means for this brake mechanism consists of a rock shaft 54 mounted in suitable bearings 55 on the base or floor and provided at one end with a crank arm 56 connected with the lower end of the rod 51. The other end of this rock shaft carries a long crank arm 57 with which is pivotally connected a link 58 which has its free end pivotally connected with the lower end of a lever 59 which is pivoted at 60 upon the frame and which is provided with a grip released locking pawl 61 co-operating with a notched segment 62. This lever 59 is illustrated as mounted on the standard 35$^a$ adjacent the lever 41 which controls the clutch mechanism.

In the operation of the device equipped with this brake structure it will be apparent that when it is desired to drive off, by its own power, a vehicle which has been treated or worked upon by means of the machine, the operator shifts the lever 41 to throw out the clutch mechanism between the motor 31 and the rollers 21, and then moves the lever 59 to rock the shaft 54 in such a direction that the arm 56 will pull downwardly upon the draw bar 49, thus applying tension to the brake bands 46 which encircle the drums 45. The rollers 21 will then be held stationary so that the vehicle may be driven off.

The device is highly advantageous for use in burning in or working in new bearings in a vehicle as the necessary movement of the parts is effected without the attendant disadvantages of operating the vehicle motor or other parts under its own power. One of the reasons why the present structure is advantageous in its use is that the only heat evolved is from friction of the bearing surfaces, the heat caused by ignition of explosive gases within the vehicle motor being entirely avoided as the vehicle motor is not operated under its own power.

From the foregoing description and a study of the drawings it will be apparent that we have thus provided a comparatively simple and yet highly efficient device for the purpose specified which will efficiently perform all the functions for which it is intended and which is adjustable and otherwise capable of variation in speed and the like to meet various conditions. Owing to the simplicity of the construction it is apparent that there is very little to get out of order and the device should consequently have an extremely long life and satisfactorily perform its purpose.

While we have shown and described the preferred embodiment of our invention, it is of course to be understood that we reserve the right to make such changes in the form, construction and arrangement of parts as will not depart from the spirit of the invention or the scope of the subjoined claims.

What is claimed is:—

1. A device of the character described comprising a frame including spaced trackways, parallel shafts journaled in the frame and carrying pairs of rollers designed to support the rear wheels of a vehicle, and means for rotating said rollers comprising gears upon said shafts and an intermediate drive gear meshing with said gears, said intermediate gear including a differential speed operated automatic clutch.

2. A device of the character described comprising a frame including spaced trackways, parallel shafts journaled in the frame and carrying pairs of rollers designed to support the rear wheels of a vehicle, and means for rotating said rollers, said means comprising gears upon said shafts and an intermediate drive gear meshing with said gears, said intermediate gear including an outer ring portion rotating about a drive disk, the disk being formed with a plurality of inclined slots of varying depth, and rollers located within said slots and constituting the drive connection between the drive disk and said ring member.

3. A device of the character described comprising a frame including spaced trackways, parallel shafts journaled in the frame transversely of the trackways and carrying pairs of rollers designed to support the rear wheels of a vehicle, a motor, a shaft driven by the motor, gears on said first named shaft, a ring gear meshing with said gears and provided internally with a roller clutch mechanism mounted upon a shaft, a friction disk on said last named shaft, a friction roller on said second named shaft slidable longitudinally thereof whereby to engage the friction disk at selected points, and lever means for moving said second named shaft toward or away from the disk, the second named shaft having a movably mounted section.

4. A device of the character described comprising a frame including spaced trackways, parallel shafts journaled in the frame transversely of the trackway and carrying pairs of rollers designed to support the rear wheels of a vehicle, a motor, a shaft driven by the motor, gears on said first named shaft, a ring gear meshing with said gears and provided internally with a roller clutch mechanism mounted upon a shaft, a friction disk on said last named shaft, a friction roller on said second named shaft slidable longitudinally thereof whereby to engage the friction disk at selected points, and lever means for moving said second named shaft toward or away from the disk, the second named shaft having a movably mounted section, and a lever control brake mechanism associated with said pairs of rollers whereby to hold them stationary.

In testimony whereof we affix our signatures.

JOHN F. JOHNSON.
WILL D. JOHNSON.